United States Patent Office 3,056,682
Patented Oct. 2, 1962

3,056,682
PEANUT COMPOSITION AND METHOD OF PRODUCING THE SAME
Don E. McOsker, Cincinnati, Ohio, assignor to The Procter & Gamble Company, Cincinnati, Ohio, a corporation of Ohio
No Drawing. Filed Nov. 14, 1960, Ser. No. 68,640
2 Claims. (Cl. 99—126)

This invention relates to an improved peanut composition and more particularly, to a roasted peanut composition of improved protein quality, containing supplementary quantities of essential amino acids.

This invention further relates to a process for improving the nutritional quality of commercially roasted peanut protein.

In recent years, medical and nutrition researchers have established the importance of adequate protein nutrition in promoting growth, muscular development and resistance to disease in children. Extensive experimentation by these researchers with animals and humans have clarified the relation between the amino acid composition of proteins and their relative nutritive value. As a result of the efforts of this group, it is well known that commercially roasted peanut protein is "inadequate," i.e., that it contains insufficient quantities of certain essential amino acids. For this reason, products derived from commercially roasted peanuts, such as peanut butter and spreads, are of limited nutritional value. Rat growth studies by various researchers indicate that the feed efficiency of diets containing roasted peanut protein is substantially below that of diets containing such protein sources as egg, meat, soybean and casein, for example. (Ruegamer, W. R., Poling, E. E. and Lockhart, H. B., An Evaluation of the Protein Qualities of Six Partially Purified Proteins, J. Nutrition, 40, 231, 1950.)

Supplementation of inadequate proteins involves increasing the level of the limiting amino acids of the particular protein source. It is recognized that indiscriminate addition of amino acids to inadequate proteins is not likely to improve the protein quality. Effective supplementation of protein entails determining which of the essential amino acids are limiting and the relative degree to which they are limiting.

Based on the teachings of the art to the effect that methionine is the most limiting amino acid of peanut protein, endeavors which have heretofore been made to supplement roasted peanut protein have involved the addition of methionine. Such supplementation has failed to improve the nutritive value of this protein. It has now been found that the nutritive qualities of roasted peanut protein can be substantially improved by adding thereto certain minimum quantities of biologically available lysine and threonine.

It is an object of this invention to prepare a peanut composition having improved nutritive qualities.

It is a further object of this invention to prepare a peanut composition having an improved balance of essential amino acids.

It is still a further object of this invention to prepare a roasted peanut composition containing adequate amounts of the essential amino acids lysine and threonine.

In general, this invention comprises an edible roasted peanut spread supplemented with at least about 0.9% and not more than about 5.0%, by weight of the total protein, of available lysine and at least about 0.2% and not more than about 3.0%, by weight of the total protein, of available threonine.

It would be expected that supplementation of roasted peanut protein with methionine, which, according to the teachings of the art, is the most limiting amino acid of peanut protein, would be necessary to improve the nutritive quality of this protein source. Controlled rat growth studies have shown, however, that supplementation with this amino acid fails to yield the expected improvement. Surprisingly, it has been found that the nutritive quality of roasted peanut protein is greatly improved when supplemented with the above combination of lysine and threonine.

The contemplated supplementation can be accomplished by adding the respective amino acids to the roasted peanut composition either in their pure crystalline form or through a complementary protein such as lactalbumin, CaSal (casein-lactalbumin fusion product commercially available through Crest Food Products, Ashton, Ill.) and the like.

Whether pure crystalline lysine and threonine or complementary proteins containing high levels of these amino acids are used to supplement roasted peanut protein compositions, the amount which must be added to attain maximum feed efficiency will depend on the total protein level of the composition to be supplemented. If less than about 0.9%, by weight of the total protein, of available lysine and 0.2% by weight of the total protein of available threonine are added, no substantial improvement of the protein quality will be obtained. Economic considerations militate against supplementation of these compositions with amounts of available lysine in excess of about 5.0%, by weight of the total protein and amounts of available threonine in excess of about 3.0%, by weight of the total protein. Further, excessive additions of the indicated amino acids can cause nutritional imbalances resulting in adverse physiological responses, such as a reduced rate of growth, and are to be avoided.

The roasted peanut products which may be improved by the practice of this invention include any comminuted food product prepared from ground roasted peanuts. Typical examples of such products are peanut butter and spread.

In the manufacture of peanut butter and spreads, to produce the desired flavor and appearance, the shelled peanuts are usually roasted in gas-fired roasters, either by radiant-heat or rapid re-circulation of hot gases over the peanuts. The roasted product is then cooled to room temperature by rapidly drawing air from the room through the hot mass. The testa (red skin) and germs (hearts) are separated by passing the roasted peanuts through a blanching machine, in which they are divided into cotyledons (peanut halves or split-peanuts), germs, and testa. The skins are aspirated away from the mixture, and the relatively small germs are separated from the cotyledons by screening. The objectionable material in the split-peanut portion, including unblanched and/or discolored nuts and foreign matter, is removed manually at a picking table. Specific-gravity separators, or oscillating shaker-screen separators are often used as adjuncts to this operation for removal of trash and damaged peanuts. The roasted peanuts are then ground into a smooth paste along with small amounts of salt, and sometimes sugar, for flavoring, and with peanut or other vegetable oil hydrogenated to various extents, or with mono- or diglycerides for the prevention of oil separation. "Chunky" peanut butters are often made by mixing chopped peanuts with the smooth product. In recent years the hot peanut butter or spread issuing from the grinder has been cooled rapidly in continuous chilling machines in order to dissipate heat before packaging and to set the added hard fats rapidly thereby preventing oil separation and producing a more palatable product. Peanut butter or spread is piped from the grinder or the chilling machine to an automatic filling machine, from which it is dispensed into jars or tins.

The relative nutritive quality of the supplemented roasted peanut compositions described, herein, was established by controlled rat feeding studies, such as is outlined in the Rutgers University, Bureau of Biological Research, Comparative Determinations of the Amino Acid Content, and of the Nutritive Value of Six Selected Protein Food Sources, 1946–1950, and is expressed as "feed efficiency." The feed efficiency of diets containing these compositions was calculated from the average cumulative feed consumption and average cumulative weight gain of test animals over a 28 day period, by the formula:

$$\frac{\text{Average weight gain}}{\text{Average feed consumption}} \times 100 = \text{feed efficiency}$$

The following examples will serve to illustrate the invention claimed with greater particularity.

*Example 1*

A peanut composition was prepared, comprised as follows:

| | Percent |
|---|---|
| Peanuts (No. I grade white Spanish) | 84.1 |
| Salt | 1.4 |
| Dextrose | 3.5 |
| Vegetable stearin | 1.75 |
| Hydrogenated vegetable oil | 3.25 |
| CaSal | 6.0 |

The peanuts were cleaned, shelled, blanched, roasted and ground to a pasty mass by conventional methods well known in the art. The additional ingredients including the protein supplement were added during the grinding process and the hot ground mix was quick cooled in a continuous chilling machine from whence it issued into containers. These methods are more fully described in U.S. Dept. of Agriculture Bulletin, A1C–370, Peanut Butter, Southern Regional Research Laboratory, New Orleans, Louisiana, March 1954.

The 6% CaSal employed in this example increased the lysine level from 2.89% to 3.97% of the total protein. A similar increase can be effected through the use of 1.08%, by weight of the total protein, of pure crystalline L-lysine rather than 6% CaSal. The available threonine level was increased from 2.47% to 2.88% of the total protein. Similarly, .41% by weight of the total protein of pure crystalline L-threonine will effect this same increase.

This composition was characterized by excellent consumer qualities, such as color, flavor, and texture. The feed efficiency of the diet containing the above composition was determined by rat growth studies in accordance with the methods described supra and compared to the feed efficiency of the diet containing a control composition comprised of 90.1% peanuts without the supplemental protein. The feed efficiency of the unsupplemented control product was found to be 30.1, whereas, the CaSal supplemented product had a feed efficiency of 35.0, representing an approximate 16.3% improvement over the unsupplemented control.

*Example 2*

A peanut butter composition was prepared as in Example 1, but increasing the lysine level to 4.81% of the total protein and increasing the threonine level to 3.23% of the total protein. The feed efficiency of the diet containing this product was 37.4 representing an improvement of 21.8% over the feed efficiency of the unsupplemented control product.

*Example 3*

A peanut butter composition was prepared as in Example 1. The lysine level of this composition was increased to 4.1% of the total protein and the threonine level was increased to 3.01% of the total protein. The feed efficiency of the diet containing this composition was 35.5, marking an improvement of 17.9% over the unsupplemented control composition.

*Example 4*

A peanut butter composition is prepared in accordance with the methods referred to above and comprised as follows:

| | Percent |
|---|---|
| Peanuts (No. I grade white Spanish) | 89.75 |
| Salt | 1.40 |
| Dextrose | 3.50 |
| Vegetable stearin | 1.75 |
| Mixed hydrogenated vegetable oil | 3.25 |
| Crystalline L-lysine (U.S.P.) | 1.00 |
| Crystalline L-threonine (U.S.P.) | .5 |

The 1.00% by weight of the total composition of available lysine employed in this example, represents an increase in the level of this amino acid from 2.89% to 6.89% of the total protein. The .5% of threonine represents an increase in the level of this amino acid from 2.47% to 4.47% by weight of the total protein.

A substantial improvement in feed efficiency of diets containing this composition is attained over a control diet containing the above composition without the supplemental essential amino acids. No adverse physiological responses are observed at this level of supplementation.

The term "roasted" as used herein and in the claims has reference to peanuts which have been heated to from 280° F. to 350° F. for from 12 to 22 minutes in accordance with standard commercial practice.

What is claimed is:

1. An edible roasted peanut spread comprising ground roasted peanuts supplemented with at least about 0.9% and not more than about 5.0%, by weight of the total protein, of available lysine and at least about 0.2% and not more than about 3.0%, by weight of the total protein, of available threonine, said spread providing a source of roasted peanut protein having improved nutritive value.

2. The method of improving the nutritive value of roasted peanut protein comprising the addition thereto of at least about 0.9% and not more than about 5.0%, by weight of the total protein, of available lysine and at least about 0.2% and not more than about 3.0% by weight of the total protein, of available threonine.

References Cited in the file of this patent

UNITED STATES PATENTS

| 2,344,229 | Block et al. | Mar. 14, 1944 |
| 2,386,926 | Block | Oct. 16, 1945 |

OTHER REFERENCES

"Heat Effects on Peanut Proteins," by Bensabat et al., reprinted from Agricultural and Food Chemistry, vol. 6, No. 10, page 778, October 1958.

"Peanut Composition," by Hoffpauir, reprinted from Agricultural and Food Chemistry, vol. 1, No. 10, pp. 668–671, August 5, 1953.